United States Patent
Zaidy et al.

(10) Patent No.: US 12,007,899 B2
(45) Date of Patent: Jun. 11, 2024

(54) DELTA PREDICTIONS FOR PAGE SCHEDULING

(71) Applicant: Micron Technology, Inc., Boise, ID (US)

(72) Inventors: Aliasger Tayeb Zaidy, Seattle, WA (US); David Andrew Roberts, Wellesley, MA (US); Patrick Michael Sheridan, Boulder, CO (US); Lukasz Burzawa, Seattle, WA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/867,371

(22) Filed: Jul. 18, 2022

(65) Prior Publication Data

US 2023/0100328 A1  Mar. 30, 2023

Related U.S. Application Data

(60) Provisional application No. 63/250,460, filed on Sep. 30, 2021.

(51) Int. Cl.
*G06F 12/0882* (2016.01)
*G06F 12/06* (2006.01)

(52) U.S. Cl.
CPC ...... *G06F 12/0882* (2013.01); *G06F 12/0646* (2013.01)

(58) Field of Classification Search
CPC ............. G06F 12/0882; G06F 12/0646; G06F 12/0862; G06F 12/0215; G06F 2212/6024;
(Continued)

(56) References Cited

U.S. PATENT DOCUMENTS 8,156,286 B2   4/2012  Deneau
2014/0351188 A1*  11/2014  Bagg ..................... G06N 3/02
                                              706/21
(Continued)

FOREIGN PATENT DOCUMENTS

WO   2023055462   4/2023

OTHER PUBLICATIONS

Doudali, Thaleia Dimitra, et al. "Kleio: A hybrid memory page scheduler with machine intelligence." Proceedings of the 28th International Symposium on High-Performance Parallel and Distributed Computing. 2019.*
(Continued)

*Primary Examiner* — Tracy A Warren
(74) *Attorney, Agent, or Firm* — Schwegman Lundberg & Woessner, P.A.

(57) ABSTRACT

Disclosed in some examples are improved address prediction and memory preloading that leverages next-delta prediction and/or far-delta prediction for scheduling using a DNN. Previous memory access sequence data that identify one or more memory addresses previously accessed by one or more processors of a system may be processed and then converted into a sequence of delta values. The sequence of delta values are then mapped to one or more classes that are then input to a DNN. The DNN then outputs a predicted future class identifier sequence that represents addresses that the DNN predicts will be accessed by the processor in the future. The predicted future class identifier sequence is then converted back to a predicted delta value sequence and back into a set of one or more predicted addresses.

18 Claims, 8 Drawing Sheets

(58) Field of Classification Search
CPC ....... G06F 2212/602; G06F 2212/6026; G06F 2212/6028; G06N 3/02; G06N 3/04; G06N 3/044; G06N 3/0442; G06N 3/049; G06N 3/0499
See application file for complete search history.

(56) References Cited

U.S. PATENT DOCUMENTS

| | | | | |
|---|---|---|---|---|
| 2017/0344880 | A1* | 11/2017 | Nekuii | G06F 17/153 |
| 2019/0108261 | A1* | 4/2019 | Hashemi | G05B 13/00 |
| 2019/0317901 | A1* | 10/2019 | Kachare | G06F 12/1009 |
| 2020/0133489 | A1* | 4/2020 | Martin | G06F 12/0862 |
| 2020/0160150 | A1* | 5/2020 | Hashemi | G06F 12/0284 |
| 2020/0201776 | A1 | 6/2020 | Isenegger et al. | |
| 2020/0272566 | A1* | 8/2020 | Saeki | G06F 12/0882 |
| 2020/0334155 | A1* | 10/2020 | Alshawabkeh | G06F 12/0862 |
| 2020/0379908 | A1* | 12/2020 | Curewitz | G06F 12/1036 |
| 2021/0117326 | A1 | 4/2021 | Ray et al. | |
| 2021/0149806 | A1* | 5/2021 | Shi | G06F 12/0877 |
| 2021/0406183 | A1* | 12/2021 | Mashimo | G06F 12/0862 |

OTHER PUBLICATIONS

Hashemi, Milad, et al. "Learning memory access patterns." International Conference on Machine Learning. PMLR, 2018.*

Sheldon, Robert. "What is volatile memory?" https://www.techtarget.com/whatis/definition/volatile-memory.*

Shevgoor, Manjunath, et al. "Efficiently prefetching complex address patterns." Proceedings of the 48th International Symposium on Microarchitecture. 2015.*

Shi, Zhan, et al. "A hierarchical neural model of data prefetching." Proceedings of the 26th ACM International Conference on Architectural Support for Programming Languages and Operating Systems. 2021.*

Srivastava, Ajitesh, et al. "Predicting memory accesses: the road to compact ml-driven prefetcher." Proceedings of the International Symposium on Memory Systems. 2019.*

Yi, Mike. "A complete guide to histograms." https://chartio.com/learn/charts/histogram-complete-guide/.*

Harkirat Shing, "Data Normalization for Numeric features," Medium, 2019, https://medium.com/analytics-vidhya/data-transformation-for-numeric-features-fb16757382c0.*

"International Application Serial No. PCT US2022 037471, International Search Report dated Nov. 11, 2022", 3 pages.

"International Application Serial No. PCT US2022 037471, Written Opinion dated Nov. 11, 2022", 4 pages.

Doudali, Thaleia Dimitra, "Tuning the Frequency of Periodic Data Movements over Hybrid Memory Systems", arXiv:2101.07200v1 cs DC, (Jan. 15, 2021), 10 pages.

* cited by examiner

DELTA PREDICTIONS FOR PAGE SCHEDULING

PRIORITY APPLICATION

This application claims the benefit of U.S. Provisional Application Ser. No. 63/250,460, filed Sep. 30, 2021, which is hereby incorporated by reference in its entirety.

GOVERNMENT RIGHTS

This invention was made with U.S. Government support under Agreement No. DE-AC05-00OR22725, awarded by the U.S. Department of Energy. The U.S. Government has certain rights in the invention.

TECHNICAL HELD

Embodiments pertain to predicting memory accesses. Some embodiments relate to predictors for page scheduling using artificial intelligence.

BACKGROUND

Memory devices for computers or other electronic devices may be categorized as volatile and non-volatile memory. Volatile memory requires power to maintain its data, and includes random-access memory (RAM), dynamic random-access memory (DRAM), or synchronous dynamic random-access memory (SDRAM), among others. Non-volatile memory may retain stored data when not powered, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
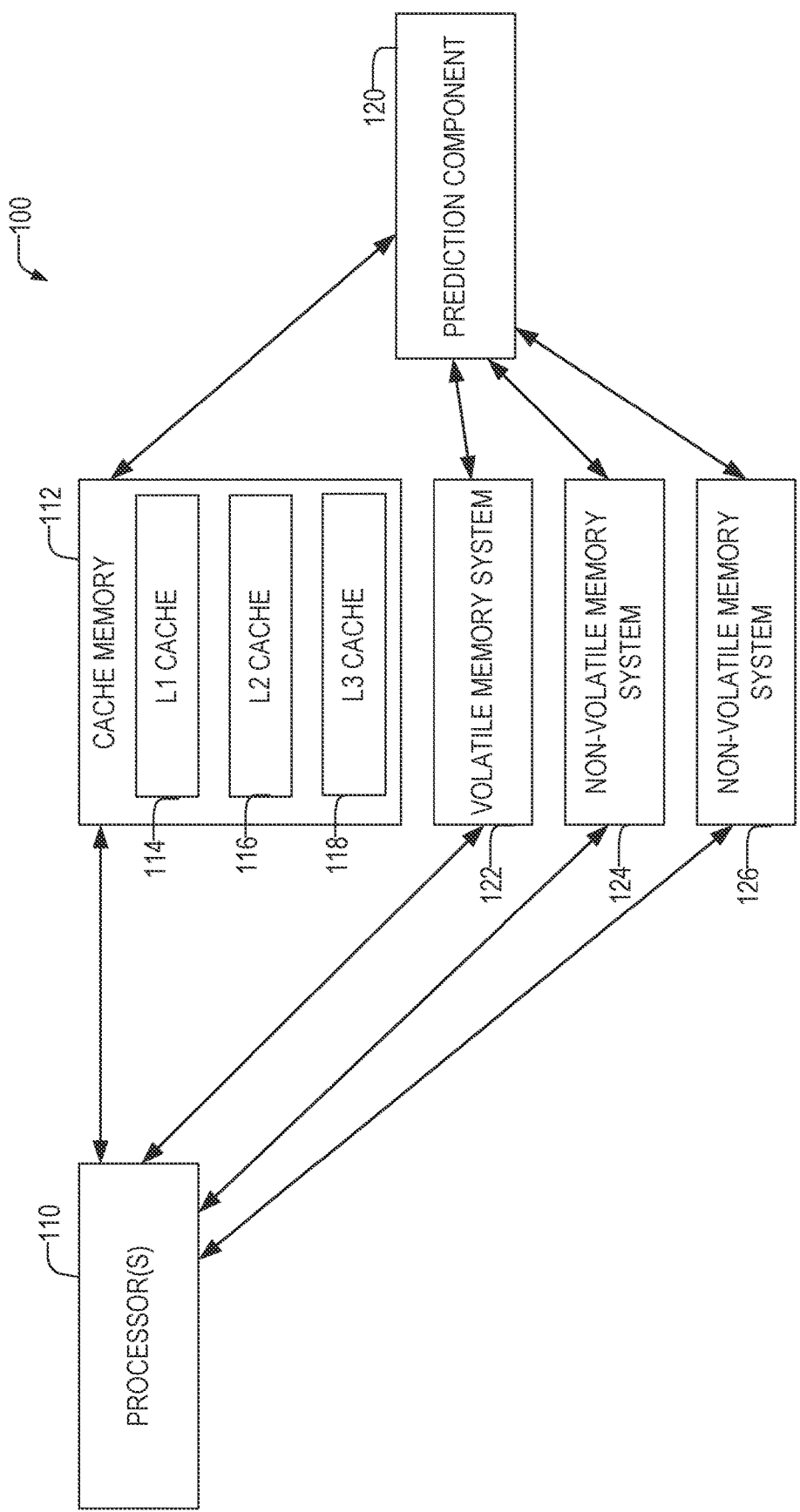
FIG. 1 illustrates a diagram of a computing system 100 according to some examples of the present disclosure.

Predictors are used in computer systems or processors in various areas, such as hardware branch predictors; instruction and data prefetchers; page schedulers; and prefetchers. Prefetchers predict which cache lines will be needed in the future and preemptively load them into a cache to reduce latency by preventing cache misses. Page schedulers predict the future level of read and write activity to a block of data and move that data, ahead of time, to the most appropriate memory device, to optimize performance and/or energy consumption.

Deep Neural Network (DNN) based predictors used with prefetch driven page scheduling may be used for memory performance optimization. These predictors can split up program execution into fixed size intervals called scheduling epochs. The number of accesses to a page within the fixed interval is calculated and a sequence of this access count data across multiple intervals is used as input to the DNN predictor. The predictor then outputs the possible access count for the next interval. Addresses with high predicted access counts are preloaded from a slower memory into faster memory. Directly predicting the access count data has proven difficult and frequently requires large DNN predictors that need to be retrained often. This technique is resource expensive and difficult to implement in real time.

Correlation-based Cache line prefetching typically utilizes next delta prediction. This involves using a sequence of memory address deltas to predict the next possible memory address delta, or a sequence of next possible memory address deltas. An address delta is a difference in address between a first address and a second address. A next address may then be determined from the delta. That is, if a last accessed memory location is P1, then the predicted next access location is P1+D1, where D1 is a delta. While the processing power required for such a prediction is small, the delta prediction task itself needs to be performed on the order of nanoseconds in some applications. While it is possible to amortize the prediction latency by predicting multiple future deltas, since new delta predictions may be based upon previous delta predictions, and because the actual memory addresses must be calculated based upon the sequence of delta values, wrong delta values may cause cumulative errors and thus, may cause poor performance.

Disclosed in some examples are improved address prediction and memory preloading that leverages next-delta prediction and/or far-delta prediction for scheduling using a DNN. Previous memory access sequence data that identifies one or more memory addresses previously accessed by one or more processors of a system may be processed and then converted into a sequence of delta values that describes differences between successive addresses of the processed previous address sequence data. The sequences of delta values are then mapped to one or more classes that are then input to a DNN that is trained as a classifier. The DNN then outputs a predicted future class identifier sequence that represents addresses that the DNN predicts will be accessed by the processor in the future. The DNN uses either next-delta or far-delta prediction. The predicted future class identifier sequence is then converted back to a predicted delta value sequence and back into a set of one or more predicted addresses. The system may then select one or more of the predicted memory addresses, for example, based upon a frequency with which the DNN predicts that the predicted address will be used, and may load those addresses from a slower memory to a faster one prior to when the processor will need the memory address.

In some examples, next delta prediction involves predicting next delta values in a sequence of delta values (e.g., a next delta value or next values in a same epoch) using previous delta values (either actual values or predictions). That is, if a memory access address sequence is P1, P2, and P3, a first delta is defined as P2−P1 and a second delta may be defined as P3−P2. These delta values may be used to obtain an address of a page to load from a slow and dense memory to a fast and less dense memory for use by a processor prior to when the processor needs the page.

In contrast, far-delta prediction predicts delta values farther out into the future. Each memory access address sequence may be divided into scheduling epochs. Far-delta prediction attempts to predict a delta value from a third epoch based upon delta values calculated from differences in addresses between a first and second epoch. The epochs may be based upon a time window (e.g., the memory accesses within a period of time), a number of memory requests, a number of processor instructions executed, or the like. Stated differently, in far delta, the system uses two previous epochs of actual observed page request data. The system calculates a set of delta values by comparing the two previous epochs of actual observed page request data. That is, by subtracting the page addresses of same page request positions in the two epochs. For example, the first delta value is calculated by subtracting the first page address of the first page request of the second epoch from the first page address of the first page request of the first epoch. The system then uses a set of these delta values (e.g., 0 . . . 64) to predict the first delta value for the next epoch (e.g., epoch 3). The system may then use a different set to calculate the second delta for epoch 3—such as by using delta values 1 . . . 55, and so on.

In some examples, a histogram of the predicted page addresses is calculated. Based upon the predicted frequency of access given by the histogram, the system may select a subset of addresses to load from a first memory device (which may be a slower memory device) to a second memory device (which may be a faster memory device). In some examples, the values to evict from the second memory device may also be informed by the page addresses in the histogram that have a low predicted frequency of access. The present disclosure's use of predicted addresses to generate an access frequency histogram differs from prior work which uses the real counts of page accesses from the previous epoch as the prediction which usually leads to worse accuracy. In the present disclosure, each predicted address increments that address's predicted future access count in the histogram which is used to produce a predicted next epoch histogram.

As previously noted, the system may then select one or more of the predicted memory addresses, for example, for loading from the slow memory to the fast memory based upon a frequency with which the DNN predicts that the predicted address will be used. For example, the system may calculate a histogram and addresses above a predicted frequency of access may be loaded into the second memory device from the first memory device and addresses below a predicted frequency of access may be evicted from the second memory device and stored on the first memory device. In other examples, a top percentage or top number of frequent addresses may be loaded from the first memory device into the second memory device. In some examples, the top percentage or number may be determined based upon a capacity of the second memory device. For example, a larger capacity of the second memory device may allow for more values to be loaded into it. In some examples, the system may artificially limit the number of memory addresses moved as a result of bandwidth or power limitations.

In some examples, the use of delta values as input and training data for the DNN rather than the addresses themselves may be due to the large potential address space of modern memory systems that use 64-bit addresses. In some examples, even delta values are potentially too sparse to offer meaningful input to the DNN. In these examples, the DNN is trained as a classifier, with each delta value being a different class. To reduce the number of classes, the frequency of each delta value in a training set is calculated and a top percentage, number, or cutoff is used. Those delta values in the top percentage, number, or above the cutoff are assigned classifications and those that do not meet the criteria are placed in a catch-all class. To map classes to delta values and back, the system may utilize a mapping table.

In some examples, the disclosed systems provide a delta prediction and page scheduling scheme that may eliminate cumulative errors produced by some current schemes and reduce the latency requirements for the predictor hardware by invoking predictions well in advance. This improves system performance and reduces energy consumption.

100241 FIG. 1 illustrates a diagram of a computing system 100 according to some examples of the present disclosure. Processors 110, such as processor cores, perform operations on various values that are in one or more memory systems, such as cache memory 112, volatile memory system 122, or non-volatile memory system 124 or 126. One bottleneck in system performance is if the processors 110 are waiting to load values from memory. Faster memory, such as cache memory 112 may be smaller in capacity but with very fast latency. Thus, accessing the cache memory 112 is much faster than accessing other memory systems. Cache memory thus "caches" or stores values that the system expects the processor will need in the future. Typical cache algorithms that determine which values to store keep values that are most recently used and evict old values that have not been used in some time. Cache memory 112 may have a variety of levels in a hierarchy such as L1 cache 114, L2 cache 116, and L3 cache 118. Each cache level down the hierarchy (moving from L1 to L3) is typically larger but with a greater latency thus the processors 110 may start at the L1 cache 114 and work their way down the hierarchy.

If the processors 110 need a value and the cache memory 112 has the value, the request is considered a cache "hit," and the value is quickly returned to the processors 110. If the cache memory 112 does not have the value, it is considered a cache "miss," and the processor 110 then attempts to retrieve the value from another memory system. Typically, a volatile memory system 122, such as Random-Access Memory (RAM) is checked next to see if the value is in RAM. RAM has a greater capacity than the cache memory 112 but is also slower. If the value is in the volatile memory system 122, then the value is loaded into the processors 110 and the value is used in computations. The cache memory 112 is then typically updated to include this value. In some examples, if the cache memory 112 is full, another value is removed from the cache (which is called eviction).

If the volatile memory system 122 does not include the value, the processors 110 may continue to search for the value. For example, one or more non-volatile memory systems, such as non-volatile memory system 124 and 126 may be consulted. If the value is found, then the processors 110 may perform the calculations on the value. Typically, the value is then cached into cache memory 112 and may be stored in the volatile memory system 122.

The memory system hierarchy shown in FIG. 1 first checks the fast, but small cache memory 112 and if that does not have the requested value, the system then checks progressively larger and slower volatile memory systems 122 and then finally the much larger and much slower non-volatile memory systems 124 and 126. In other examples, other types of memory and other hierarchies may be utilized. In these examples, this non-volatile memory system may be checked for the value prior to the volatile memory system 122. The types of memory and the configuration shown in FIG. 1 is exemplary only and in some examples, various memory systems in the hierarchy may mix and match different types of memory and may include both volatile and non-volatile memory.

Prediction component 120 may use historical memory access information to predict future memory access requests for one or more of the memory systems. In doing so, the prediction component may preload a memory value from a slower memory system to a faster memory system in advance of the request by the processors 110 to speed up access time by the processors 110. For example, the prediction component 120 may move memory values from the non-volatile memory system 124 or 126 to a volatile memory system 122; from one of the non-volatile memory systems 124 or 126 to the other of the non-volatile memory systems 124 or 126; and the like. In general, the prediction component 120 may move memory values from a slower memory system to a faster memory system. Thus, if non-volatile memory system 124 is faster than non-volatile memory system 126, the prediction component 120 may move values from non-volatile memory system 126 to non-volatile memory system 124.

In some examples, the prediction component 120 may be an execution thread running on one or more of the processors 110, it may be software running on a general purpose processor such as a Graphics Processing Unit (GPU), it may be a dedicated integrated circuit or combination of integrated circuits, an accelerator on one or more memory devices of one or more memory systems, or the like.

Figure 2:
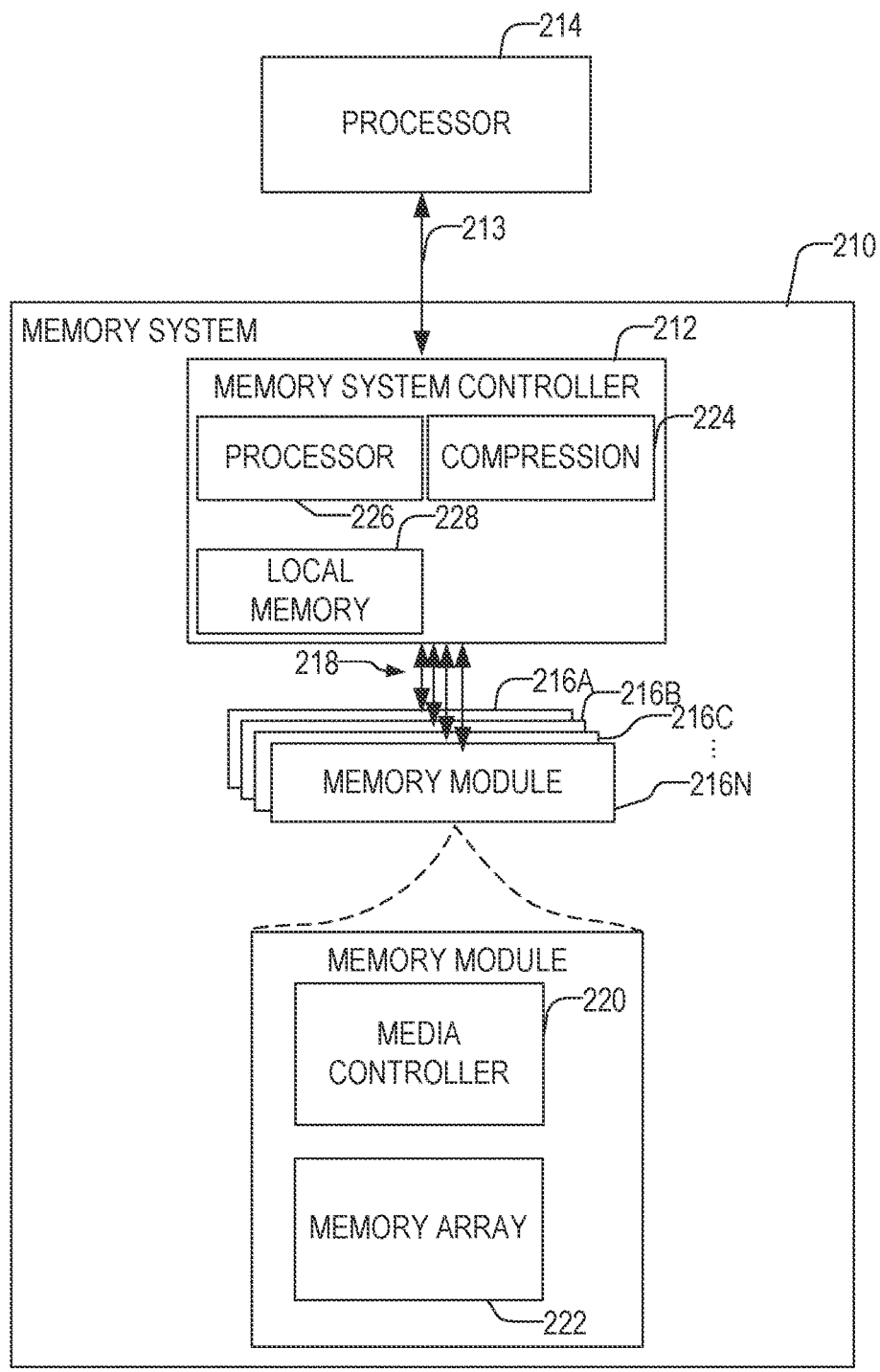
FIG. 2 illustrates an example computing environment 200 including a memory system 210, in accordance with some examples of the present disclosure.

FIG. 2 illustrates an example computing environment 200 including a memory system 210, in accordance with some examples of the present disclosure. Memory system 210 may include volatile or non-volatile memory and may allow processor 214 (which may be or include one or more processors 110 of FIG. 1) to store and read data to and from the memory system 210. In some examples the memory system 210 may be a random-access memory (RAM) which is used by processor 214 to load and store instructions and other values. In some examples, the memory system 210 may be non-volatile storage device such as a solid-state drive (SSD), a Universal Flash Storage (UFS) device, an embedded Multi-Media Controller (eMMC) drive, a hard disk drive (HDD), or the like.

The memory system 210 may include a memory system controller 212. The memory system controller 212 may be coupled with processor 214. Processor 214 may include one or more processor cores. In some examples, processor 214 and memory system controller 212 may be on a same die. For example, on x86-based systems, the memory controller may be on a same die as one or more processor cores of processor 214. In other examples, memory system controller 212 may be on a separate die from the processor 214. In yet other examples, the memory system controller 212 may be on a same package as the processor cores, but a separate die. Memory system controller 212 and the processor 214 may be coupled over first interface 213.

In examples in which the memory system 210 is non-volatile storage, such as an SSD or UFS device, and in which the memory system controller 212 is not on the same die or package as the processor 214, the first interface 213 may be a Peripheral Component Interconnect-Express (PCIe) bus, a UFS bus, a serial advanced technology attachment (SATA) interface, a universal serial bus (USB) interface, a Fibre Channel, Serial Attached SCSI (SAS), an eMMC interface, or the like. In examples in which the memory system 210 is volatile RAM, and the memory system controller 212 is not on the same die or package as the processor 214, the first interface 213 may be a system bus or a front-side bus. In examples in which the memory system controller 212 is on a same die or package as the processor 214, the first interface 213 may be one or more traces, pins, or the like.

Memory modules such as modules 2:16A to 216N may be coupled to the memory system controller 212 over one or more internal or external second interfaces 218. In examples in which the memory system 210 is a volatile RAM system and the memory system controller 212 is on a same die or package as the processor 214, the second interfaces 218 may be a system bus or front-side bus. In other examples, where the first interface 213 is the front-side bus or system bus, then the second interface 218 may be a memory bus. In examples in which the memory system is non-volatile storage, such as a NAND device, the second interface 218 may be an internal memory bus.

The memory system 210 is shown, by way of example, to include the memory system controller 212 and media, such as memory modules 216A to 216N. The memory modules 216A to 216N may include any combination of the different types of volatile and/or non-volatile memory devices. In some examples, memory modules 216A to 216N may include random access memory (RAM), dynamic random-access memory (DRAM), such as in the form of or more Single Inline Memory Modules (SIMMS), Dual Inline Memory Modules (DIMMS) and the like; and/or as mentioned earlier herein, the memory modules may be any of various forms of stacked SDRAM die. In the case of such stacked SDRAM die, controller functionality implemented at least in part through control circuitry and related logic is often found on an associated die which in some examples, may be stacked with multiple SDRAM die. DIMMS may include control functionality, part of which may be present in a register clock driver (RCD) included on the memory module.

In some examples, memory modules 216A to 216N may include non-volatile memory devices such as negative-and (NAND) type flash memory. Each of the memory modules 216A to 216N may include one or more memory arrays of memory cells such as single level cells (SLCs) or multi-level cells (MLCs) (e.g., triple level cells (TLCs) or quad-level cells (QLCs)). In yet other examples, the memory modules 216A to 216N may include phase change memory (PCM), magneto random access memory (MRAM), negative-or (NOR) flash memory, electrically erasable programmable read-only memory (EPROM), and/or a cross-point array of non-volatile memory cells. A cross-point array of non-volatile memory may perform bit storage based on a change of bulk resistance, in conjunction with a stackable cross-gridded data access array. Additionally, in contrast to many Flash-based memory, cross point non-volatile memory may perform a write in-place operation, where a non-volatile memory cell may be programmed without the non-volatile memory cell being previously erased.

Each of the memory cells of the memory array 222 may store bits of data (e.g., data blocks) used by the processor 214 or another component of a host system. Memory modules 216A-216N may include a separate media controller 220, a memory array 222, and other components. In some examples, the memory modules 216A-N may not include a media controller 220. Furthermore, the memory array 222 of the memory modules 216A-N may be grouped in one or more logical organizations. For volatile storage, one example logical organization groups memory cells by banks and rows. For non-volatile storage, one example logical organization includes grouping cells into planes, sub-blocks, blocks, or pages.

The memory system 210 may include a memory system controller 212 with processor and local memory 228. Memory system controller 212 may communicate with the memory modules 216A to 216N to perform operations such as reading data, writing data, or erasing data at the memory modules 216A to 216N and other such operations. The memory system controller 212 may include hardware such as one or more integrated circuits and/or discrete components, a buffer memory, or a combination thereof. The memory system controller 212 may be a microcontroller, special purpose logic circuitry (e.g., a field programmable gate array (FPGA), an application specific integrated circuit (ASIC), etc.), or other suitable processor. The memory system controller 212 may include a processor 226 (processing device) configured to execute instructions stored in a local memory. In the illustrated example, the local memory of the memory system controller 212 may include embedded memory 228 configured to store instructions for performing various processes, operations, logic flows, and routines that control operation of the memory system 210, including handling communications between the memory system 210 and the processor 214. In some embodiments, the local memory of the memory system controller 212 may include memory registers storing, e.g., memory pointers, fetched data, etc. The local memory may also include read-only memory (ROM) for storing micro-code.

In general, the memory system controller 212 may receive commands or operations from the processor 214 (or other component of a host) and may convert the commands or operations into instructions or appropriate commands to achieve the desired access to the memory modules 216A to 216N. The memory system controller 212 may be responsible for other operations such as wear leveling operations (e.g., garbage collection operations, reclamation), error detection and error-correcting code (ECC) operations, encryption operations, caching operations, block retirement, and address translations between a logical block address and a physical block address that are associated with the memory modules 216A to 216N. The memory system controller 2:12 may further include interface circuitry to communicate with the processor via the first interface 213. The interface circuitry may convert the commands received from the processor 214 into command instructions to access the memory modules 216A to 216N as well as convert responses associated with the memory modules 216A to 216N into information for the processor 214 or other component of the host system.

The memory system controller 212 may include a set of management tables to maintain various information associated with one or more components of the memory system 210. For example, the management tables may include information regarding block age, block erase count, error history, or one or more error counts (e.g., a write operation error count, a read bit error count, a read operation error count, an erase error count, etc.) for one or more blocks of memory cells coupled to the memory system controller 212.

In some examples, the functions of media controller 220 may be performed by the memory system controller 212.

Memory modules 216A-216N may include a media controller 220 that may communicate with the memory modules 216A to 216N to receive commands from the memory system controller 212 and to perform operations such as reading data, writing data, or erasing data from the memory array 222. For example, the media controller 220 may parse a command and determine the affected memory cells from the memory array 222 and may read and/or write a desired value to those memory cells. Media controller 220 may be responsible for refreshing or otherwise maintaining the data stored in the memory array 222.

The media controller 220 may include hardware such as one or more integrated circuits and/or discrete components, a buffer memory, or a combination thereof. The media controller may be a microcontroller, special purpose logic circuitry (e.g., a field programmable gate array (FPGA), an application specific integrated circuit (ASIC), etc.), or other suitable processor(s). The media controller 220 may include a processor (processing device) configured to execute instructions stored in a local memory, in the illustrated example, the local memory of the media controller 220 may include embedded memory configured to store instructions for performing various processes, operations, logic flows, and routines that control the memory array 222, including handling communications between the memory module 216A-216N and the memory system controller 212. In some embodiments, the local memory of the media controller 220 may include memory registers storing, e.g., memory pointers, fetched data, etc. The local memory may also include read-only memory (ROM) for storing micro-code. Media controller 220 may also include address circuitry, row decoders, I/O circuitry write circuitry, column decoders, sensing circuitry, and other latches for decoding addresses, writing to, and reading from the memory array 222.

Processor 214, as well as memory system 210 may be integrated into a host system. The host system may be a computing device such as a desktop computer, laptop computer, network server, mobile device, or such computing device that includes a memory and a processing device. The host system and/or the memory system 210 may be included in a variety of products, such as IoT devices (e.g., a refrigerator or other appliance, sensor, motor or actuator, mobile communication device, automobile, drone, etc.) to support processing, communications, or control of the product. The host system may include or be coupled to the processor 214 and to the memory system 210 so that the host system may read data from or write data to the memory system 210. As used herein, "coupled to" generally refers to a connection between components, which may be an indirect communicative connection or direct communicative connection (e.g., without intervening components), whether wired or wireless, including connections such as, electrical, optical, magnetic, and the like.

In an example, the memory system 210 may be a discrete memory and/or storage device component of a host system. In other examples, the memory system 210 may be a portion of an integrated circuit (e.g., system on a chip (SOC), etc.), stacked or otherwise included with one or more other components of a host system.

As previously noted, the present disclosure predicts memory requests and preloads the values into a faster memory from a slower memory using next and/or far delta prediction. As noted, conventional page scheduling predictors within computer processors (e.g. memory prefetchers) make predictions at fixed intervals. Prefetcher designs may be characterized by their performance vs implementation burden. Existing designs weigh towards low performance or high cost. For example, next-line, stride, or correlation predictors are relatively low performance, but also have a low implementation burden. Temporal (large table), run-ahead, and static compiler-based solutions are high implementation burden, but also high performance. Run-ahead predictors launch an additional execution thread that only includes instruction sequences which lead to a memory access (e.g. address calculation). The thread runs ahead of the main code, loading data into the cache before it is needed. This requires an extra compute core and control mechanisms. On the other hand, correlation prefetching predicts future addresses from a history of prior accesses, sometimes taking other context into account such as program counter (PC) of load instructions. To hide more latency, next-line, stride and correlation prefetchers often have a depth parameter. Assuming the predicted delta (or delta history) will remain constant, N deltas are added together to predict N requests into the future. This introduces the possibility for cumulative error and accuracy typically reduces as depth increases. DNN-based prefetching may have the potential to approach the accuracy of run-ahead execution with lower implementation complexity, due to the use of widespread commodity DNN acceleration hardware.

Figure 3:
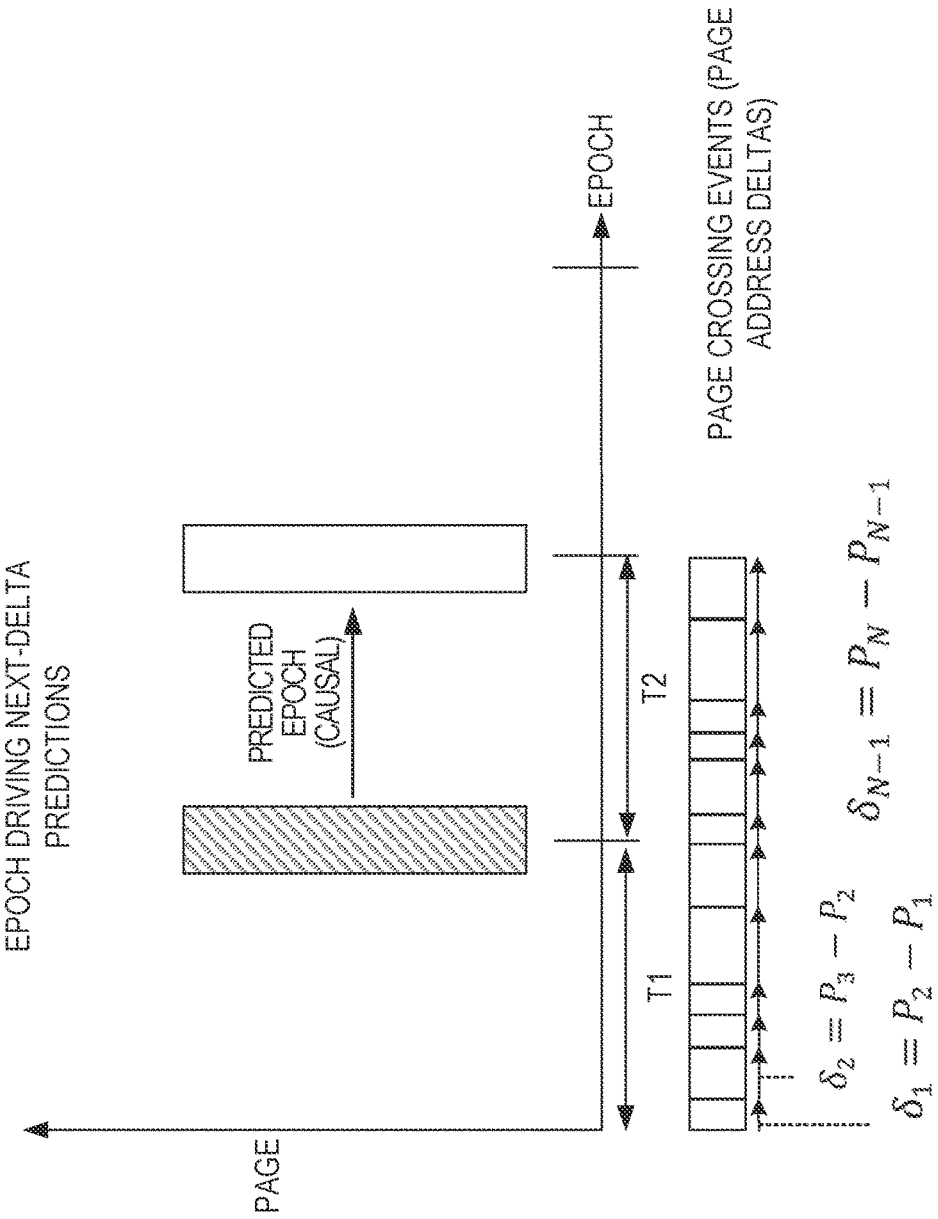
FIG. 3 illustrates page scheduling using next-delta prediction according to some examples of the present disclosure.
Figure 4:
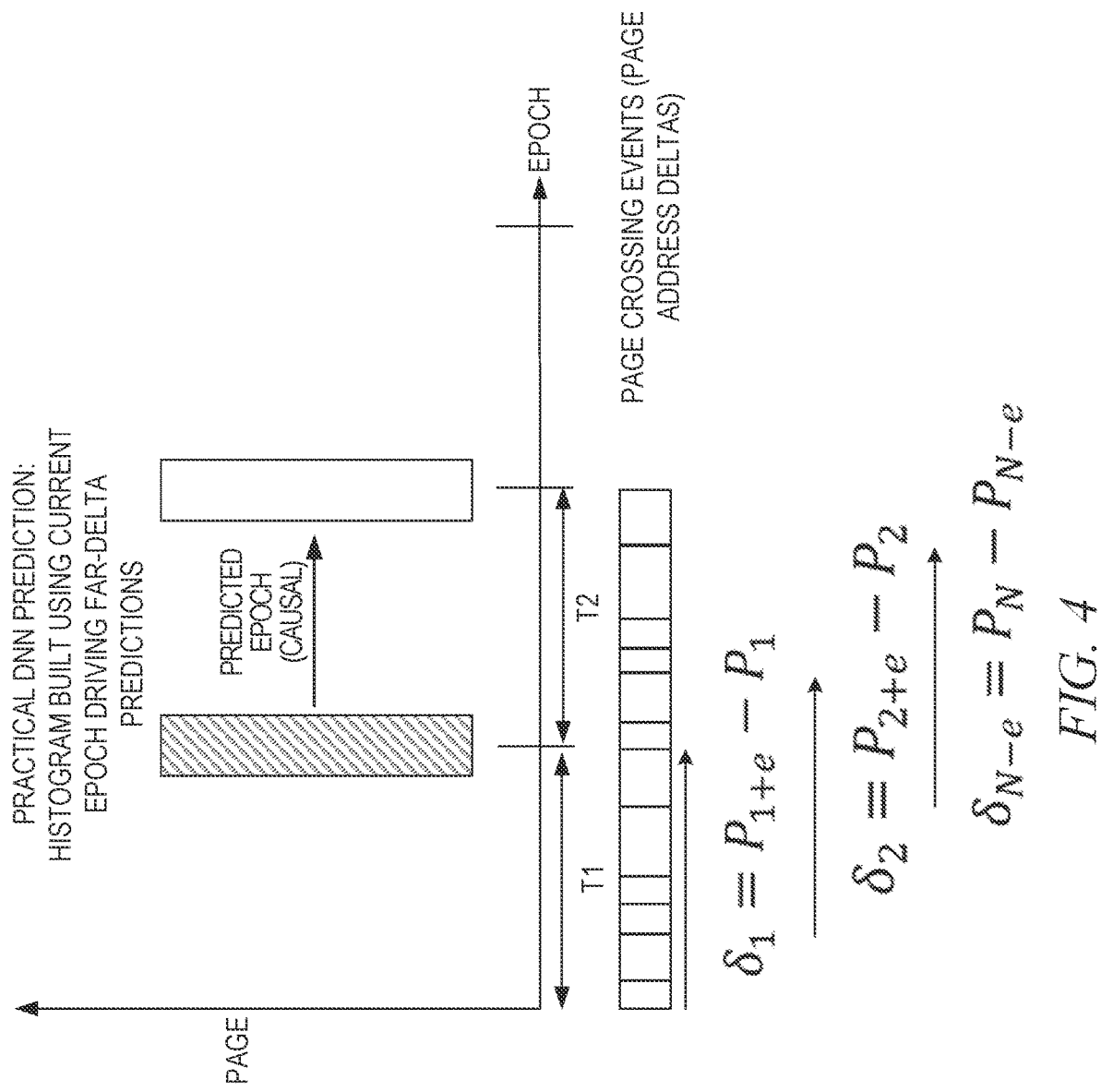
FIG. 4 illustrates page scheduling using far-delta predictions according to some examples of the present disclosure.

In some examples, the DNN may be used for next-delta predictions or far-delta predictions. FIG. 3 illustrates page scheduling using next-delta prediction and FIG. 4 illustrates page scheduling using far-delta predictions according to some examples of the present disclosure. FIG. 3 shows next sequential memory addresses being predicted using the delta (difference) between one or more prior address deltas. By predicting multiple addresses into the future (faster than real-time), a predicted page access frequency histogram may be generated. The predicted histogram may be used to determine which pages are predicted to have high or low access frequencies in the upcoming epoch. FIG. 4 shows how deltas separated by a fixed distance e (e.g. memory requests) from each other are instead used as input to the predictor. Because predictions are for memory addresses expected to appear in a future epoch, the predicted frequency histogram may be generated without running ahead of the program, unlike next-delta prediction.

Next Delta Prediction

Next delta prediction deals with predicting page addresses that reside adjacent to each other. The page delta trace is created from a page address trace (of length N) by calculating the difference between consecutive page addresses. The general formula is $\delta_i=P_{i+1}-P_i \forall i \in [1, N-1]$ where $\delta_i$ and $P_i$ denote the $i^{th}$ page delta and page address respectively. As mentioned before, to predict a number of page addresses well in advance, the system may input the predicted delta outputs of the DNN as inputs for the next prediction. When deriving page addresses back from the predicted deltas, later page addresses will be obtained from a greater number of predicted deltas and could contain cumulative errors.

Let the page addresses of an observed request sequence be denoted as P1, P2, P3, . . . , PN and deltas are denoted as $\delta_1$, $\delta_2$, $\delta_3$, . . . , $\delta_{N-1}$. The ground truth deltas are calculated as:

$$\delta_1 = P_2 - P_1$$
$$\delta_2 = P_3 - P_2$$
$$\delta_3 = P_4 - P_3$$
$$\vdots$$
$$\delta_{N-1} = P_N - P_{N-1}$$

In an example, deltas $\delta_1$ to $\delta_S$ are known inputs (i.e., $P_1$ to $P_{S+1}$ are known) for predicting $\delta_{S+1}$ to $\delta_L$. Here S denotes the history length for deltas that are input to the DNN predictor. Let the predicted delta; be denoted as $\delta_{S+1}'$ to $\delta_L'$. To estimate page address $P_i'$ where i∈ [S+1, L] we will use the formula $P_i'=P_{S+1}+\Sigma_{j=S+1}^{i}\delta_j'$. If any of the predictions between S+1 to i are incorrect $P_i'$ could be incorrect. In the worst case a single misprediction of $\delta_{S+1}'$ could cause all predicted page addresses to be incorrect. This demonstrates the need of a non-cumulative address prediction scheme.

While the description of the next delta prediction utilizes page addresses, in some examples, the system may use memory addresses and memory address deltas. This may allow the system to increase a prediction error tolerance. That is, because a page contains many memory addresses, if the system is off by a small amount on the exact memory address, but still loads a page that has both the predicted memory address and the actually requested memory address, the system performance is still improved as the actual memory address is still in the fast memory.

Far Delta Prediction

Far delta prediction involves using known deltas (between page addresses) to predict deltas far out into the future. In some examples, unlike the next delta trace, far delta generation utilizes a scheduling epoch. As previously mentioned, the scheduling epoch could be determined based upon the number of memory accesses, processor operations, time periods, or the like. In some examples, the scheduling epoch may be determined using a metric like dominant reuse distance. First, the delta memory trace that includes the historical memory accesses is split into sub traces that are the length of a scheduling epoch. Next, the delta between 2-page addresses that reside at the same position within consecutive scheduling epochs is calculated to generate the far delta trace. The formula is $\delta_i=P_{i+e}-P_i$ where e is the length of the scheduling epoch.

Let the page addresses be denoted as P1, P2, P3, . . . , PN and deltas are denoted as $\delta_1$, $\delta_2$, $\delta_3$, . . . , $\delta_{N-e}$ where e denotes the scheduling epoch. The ground truth deltas are calculated as:

$$\delta_1 = P_{1+e} - P_1$$
$$\delta_2 = P_{2+e} - P_2$$
$$\delta_3 = P_{3+e} - P_3$$
$$\vdots$$
$$\delta_{N-e} = P_N - P_{N-e}$$

Deltas $\delta_1$ to $\delta_S$ may be used as known inputs (i.e., $P_1$ to $P_{S+1}$ are known) for predicting $\delta_{e+1}$. Here S(≤e) denotes the history length for deltas that are fed to the DNN predictor. Extending across an epoch $\delta_1$ to $\delta_e$ may be used as known inputs for predicting $\delta_{e+1}$ to $\delta_{2e}$. The predicted deltas for the next epoch will be $\delta_{e+1}'$ to $\delta_{2e}'$. To estimate page address $P_1'$ where i∈[e+1, 2e] the formula $P_i'=P_{i-e}+\delta_i$ may be used. Unlike the next-delta approach, a single mis-predicted delta will not impact all subsequent address estimations. This demonstrates the error tolerance of a non-cumulative address prediction scheme.

As with next delta prediction, the description of far delta prediction utilized page addresses. In some examples, the system may use memory addresses and memory address deltas for far delta prediction instead. This may allow the system to increase a prediction error tolerance. That is, because a page contains many memory addresses, if the system is off by a small amount on the exact memory address, but still loads a page that has both the predicted memory address and the actually requested memory address, the system performance is still improved as the actual memory address is still in the fast memory.

Stated differently, in far delta, the system uses two previous epochs of actual observed page request data. The system calculates a set of delta values by comparing the two previous epochs of actual observed page request data. That is, by subtracting the page addresses of same page request positions in the two epochs. For example, the first delta value is calculated by subtracting the first page address of the first page request of the second epoch from the first page address of the first page request of the first epoch. The system then uses a set of these delta values (e.g., 0 . . . 64) to predict the first delta value for the next epoch (e.g., epoch 3). The system may then use a different set to calculate the second delta for epoch 3 such as by using delta values 1 . . . 65, and so on.

Next-Delta to Far Delta (Decoupled Delta)

In some examples, the system may use next-delta to far delta (decoupled delta) predictions. This may entail the system utilizing a sequence of delta values calculated from addresses within a particular epoch (e.g., the delta values are created in a same fashion as for the next-delta prediction) to predict delta values in a next epoch. The next delta trace is used as an input to the INN while the far delta trace is the output. For example, we use $\delta_{n1}=P_2-P_1$ to $\delta_{ns}=P_{s+1}-P_s$ as known inputs to predict $\delta_{fi}=P_{i+e}-P_{si}$ where e is the length of the scheduling epoch. Stated differently, the system uses actual observed page requests to calculate observed delta values for a first epoch. A set of these observed delta values is then used to make a prediction about a delta for a second epoch. A set of these observed delta values is then used to make a prediction about a delta for a second epoch. For example, delta values 0 . . . 64 from epoch zero may be used by the DNN to predict the first delta from epoch one. Similarly, delta values 1 . . . 65 from epoch zero may be used by the DNN to predict the second delta from epoch one.

DNN Model Training

In both next and far delta cases, the memory trace obtained after preprocessing has a wide dynamic range. Effectively training DNNs may require data to have to be normalized. Additionally, while DNNs may perform regression there is generally a margin of error since DNN outputs are probability vectors. To maintain accurate outputs, in some examples, the prediction is formulated as a classification problem instead of regression problem. In classification, each unique delta value in the sequence may be denoted by a certain class number. The input to the DNN may be a sequence of class numbers instead of a sequence of deltas. The number of outputs of the DNN will be equal to the number of classes. If all possible delta values are considered this approach may also become intractable as the largest delta value is also nearly equal to the size of the memory space. In some examples a cap may be imposed on the maximum number of classes to predict and assign deltas (in descending order of frequency of occurrence) to those classes. That is, the training data set may be analyzed and each of the deltas with the highest (e.g., over a threshold, highest %, or highest N) frequency may be represented by a class. The remaining deltas, which would ideally be rarely occurring ones, are assigned to a single unknown class. As previously described a mapping table may convert delta values to class identifiers and back.

After the delta trace is converted into the class format, the data may be split up to perform DNN training. In some examples, 20% of the historical memory trace data may be used as the training set and 80% used as the validation set. The split may be performed sequentially so the first 20% deltas are fed to the DNN for training and the remaining 80% are simply used during inferencing. After training is complete, the entire trace is passed through the DNN, and the resulting predicted address trace may be used for offline analysis and system simulations.

In some examples, the input data that is used to train the DNN may be perturbed to enhance the robustness of the DNN model. The perturbations may include reordering the memory traces, adding random addresses into the sequence, and the like.

Multilayer Perceptron (MLP)

Figure 5:
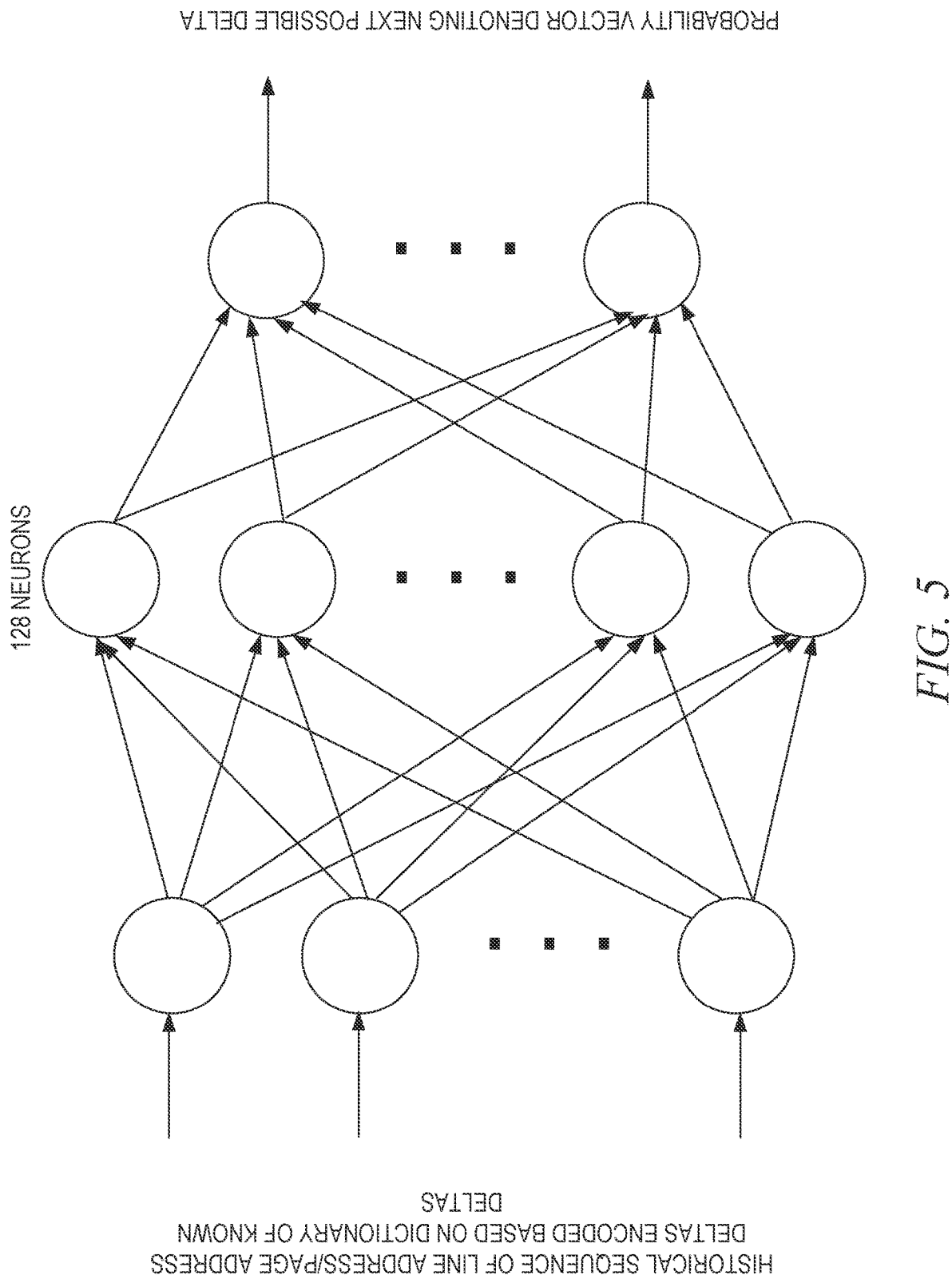
FIG. 5 illustrates a multilayer perceptron neural network according to some examples of the present disclosure.

In some examples, the DNN may be an MLP, FIG. 5 illustrates a multilayer perceptron neural network according to some examples of the present disclosure. MLP is a type of feedforward neural network that is comprised of a series of cascaded layers. Each layer consists of a matrix of filter or weight data that is multiplied with a vector of input data to produce a vector of output data. This output data vector then serves as the input to the next layer. The input to the first layer is the sequence of known and/or previously predicted page or memory address deltas. The output of the last layer is the next possible delta. In some examples, the MLP is composed of inputs, 2 hidden layers of 2048 nodes each, and 2049 outputs. In some examples, the MLP is trained on 2048 known (+1 unknown) classes.

The MLP may also be fed multiple inputs in what is known as batching (batched processing). When using batching, the input data is converted from a vector into a matrix with each row of the matrix representing one of the inputs. Computationally, this results in each layer of the MLP being a matrix-matrix multiplication. Depending on the availability of dedicated external memory for DNN acceleration, batching could be used to convert a bandwidth bound problem (vector-matrix multiplication) to a compute bound problem (matrix-matrix multiplication).

Long Short-Term Memory (LSTM)

Figure 6:
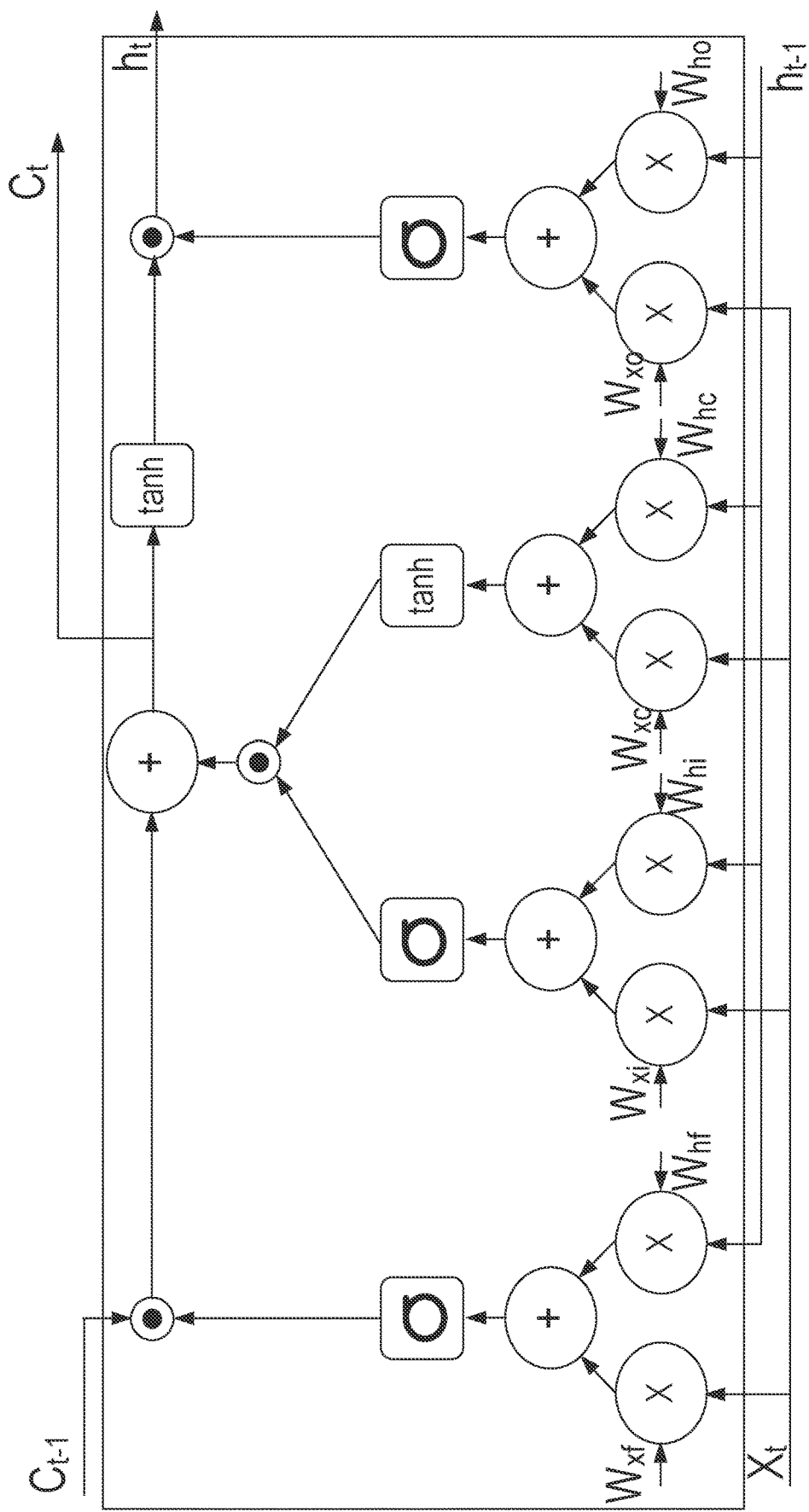
FIG. 6 illustrates a LSTM network according to some examples of the present disclosure.

LSTM is a type of recurrent neural network that uses a series of gates in order to maintain temporal information. Unlike the MLP, LSTM uses feedback connections in order to maintain temporal context across predictions. FIG. 6 illustrates a LSTM network according to some examples of the present disclosure.

A typical LSTM consists of three types of gates: input gate, output gate, and forget gate. A sequence of input data is inputted by the system to the LSTM, which tries to predict the next item in the sequence. In some examples, the LSTM uses a sequence length of 64. Multiple LSTM modules may be cascaded to together with the output of one acting as the input to the next (2 in some examples). The LSTM cell has a state, and the size of the state is a tunable hyper parameter. In some examples, the state may be a 128 wide state and the LSTM may be trained on 50000 known (+1 unknown) classes. Computationally, an LSTM is a memory bandwidth bound workload, so the execution time is highly dependent on the type of DRAM used to supply the DLA modules. A small enough LSTM may be stored in the on-chip SRAM resulting in a compute bound workload. An SRAM large enough to enable complete on-chip LSTM storage might be expensive for the page scheduling application.

Figure 7:
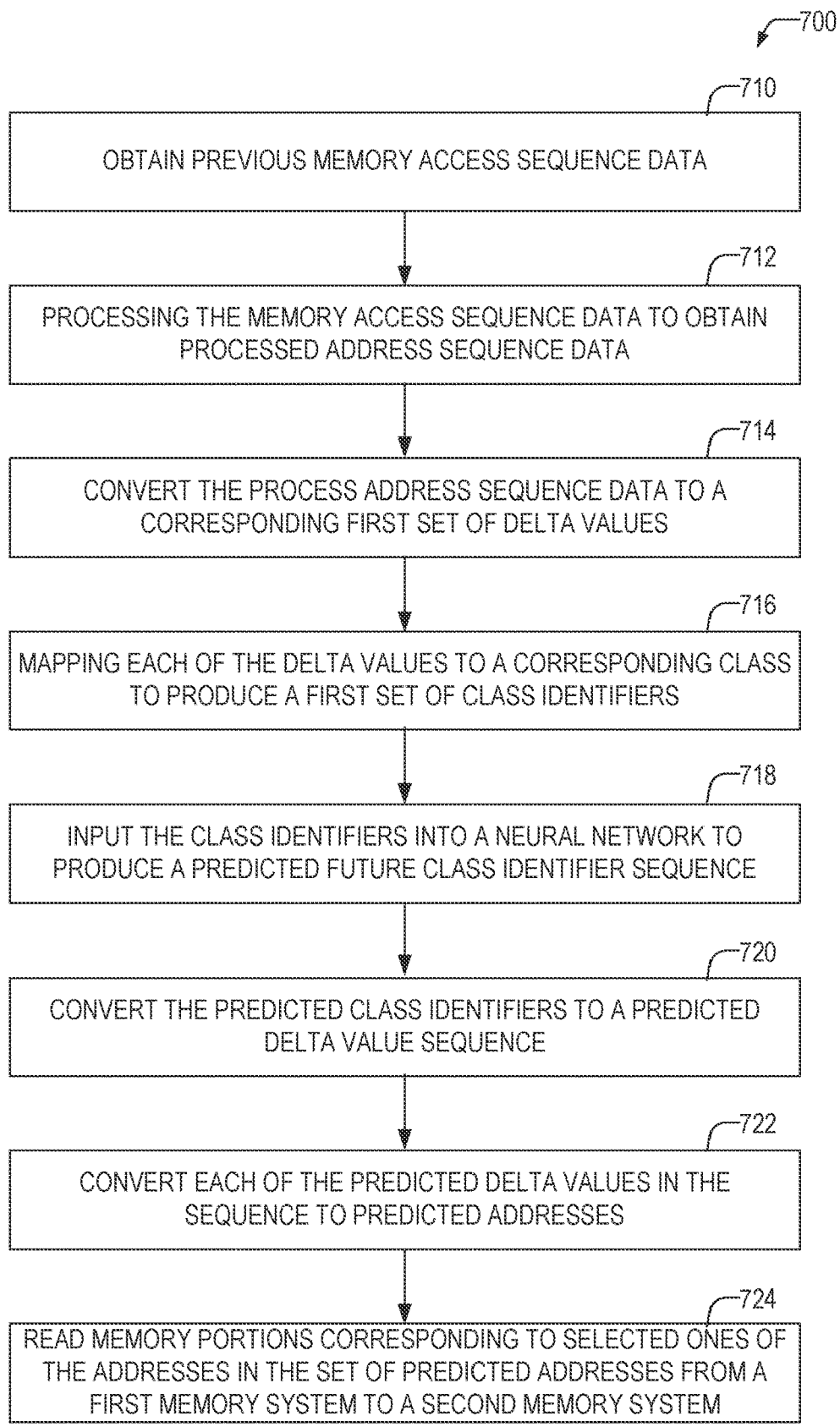
FIG. 7 illustrates a flowchart of a method for predicting addresses according to some examples of the present disclosure.

FIG. 7 illustrates a flowchart of a method 700 for predicting addresses according to some examples of the present disclosure. In some examples the method 700 may be performed by the prediction component 120 of FIG. 1. Method 700 may be performed on memory addresses or page addresses. At operation 710 the prediction component may obtain previous memory access sequence data, the memory access sequence data identifying one or more memory addresses previously accessed by one or more processors. For example, records or traces of actual memory access sequences for previous time periods.

At operation 712, the prediction component may process the memory access sequence data to obtain processed address sequence data. For example, by converting memory addresses to page addresses or vice versa. At operation 714, the prediction component may convert the processed address sequence data to a corresponding first set of delta values, the first set of delta values describing the differences between successive addresses of the previous processed address sequence data. That is, from the memory or page addresses, the prediction component may convert the sequence data to delta values describing the differences between each value in the sequence data.

At operation 716, the prediction component may map, using a mapping table, each of the delta values of the first set of delta values to a corresponding class to produce a first set of class identifiers. As noted, the DNN may be a classification DNN that may operate on a number of classes that is less than a number of possible memory addresses or delta values. As previously noted, during training, the DNN may define a set of classes based upon frequency data of delta values of the training data. In some examples, the set of delta values of a defined size with the highest frequencies may each be represented by a class and delta values outside the set may all be represented by a single class. The mapping between delta values and classes may be created during training and stored for us in the prediction stage, such as at operation 716.

At operation 718, the prediction component may input the class identifiers of the first set of class identifiers into a neural network, the neural network producing a predicted future class identifier sequence identifying a set of one or more class identifiers representing one or more predicted future class identifiers, the predicted future class identifiers representing addresses the neural network predicts will be accessed by the processor in the future. As noted, the neural network may be a DNN, such as an MLP or LSTM. In some examples, a predicted class identifier may be output for a first class identifier in the sequence of predicted future class identifiers and then used as input into another execution of the DNN to produce a second predicted class identifier and so on until a sequence of a desired size of future class identifiers are produced. In other examples, the DNN produces a sequence of a desired size of future class identifiers in one execution.

At operation 720, the prediction component may convert each of the predicted class identifiers in the predicted future class sequence to produce a predicted delta value sequence comprising one or more delta values corresponding to the one or more class identifiers of the predicted class sequence. That is, the prediction component converts the output of the DNN back from class identifiers to delta values—using, e.g., the mapping table.

At operation 722, the prediction component may convert each of the predicted delta values in the predicted delta value sequence to produce a set of predicted addresses. That is, the system may calculate the address values (either page or memory) from the delta value sequence.

At operation 724, the prediction component may read memory portions corresponding to selected ones of the addresses in the set of predicted addresses from a first memory system and into a second memory system. In some examples, the prediction component may utilize a histogram of the predicted addresses to determine a threshold number of addresses to load. That is, the addresses that are predicted to be used more frequently in the future may be loaded from the first memory to the second memory. In some examples, the performance gain from preloading addresses that are less frequently used may not be worth the penalty of preloading them. The threshold number of addresses may be calculated based upon one or more of the size of the second memory system, a power budget, a bandwidth budget, or the like.

When DNN prediction resources are limited, the request rate may exceed the peak prediction rate capability. In those situations, a conventional predictor component (prefetcher or page scheduler) could be operated in parallel with the DNN-based predictor. While the DNN predictor is busy processing a batch of addresses, incoming addresses could be ignored until the predictor is no longer busy. During its busy time, the output of the conventional predictor is used instead. Different options for hybrid prediction include: ignoring (dropping) requests for prediction purposes, while the DNN predictor is busy; using the predictions from another (conventional) predictor running in parallel while the DNN predictor is busy; Making DNN predictions in batches (sequential groups of input addresses); Making DNN predictions in an interleaved manner (e.g. process every other input, or a percentage of inputs); or the like.

In some examples, the system may utilize online or offline training using random delays added to memory requests, or to processor instructions, to force valid re-orderings of input data to occur. For example, due to out-of-order processor instruction execution, multi-threading, system interrupts, or memory bank conflicts. This may make a trained predictor more robust and portable across multiple program runs and processor/system architectures. For example, data generation may be modified to increase the robustness of the trained DNN. There are several traditional data augmentation schemes such as injecting noise into the generated trace that may be used. Additionally, while generating data for offline or online training, the system may inject random delays (e.g. at memory controller, or in the pipeline) to generate a valid reordering of memory requests. A DNN trained on such data may be more resistant to system delays.

Figure 8:
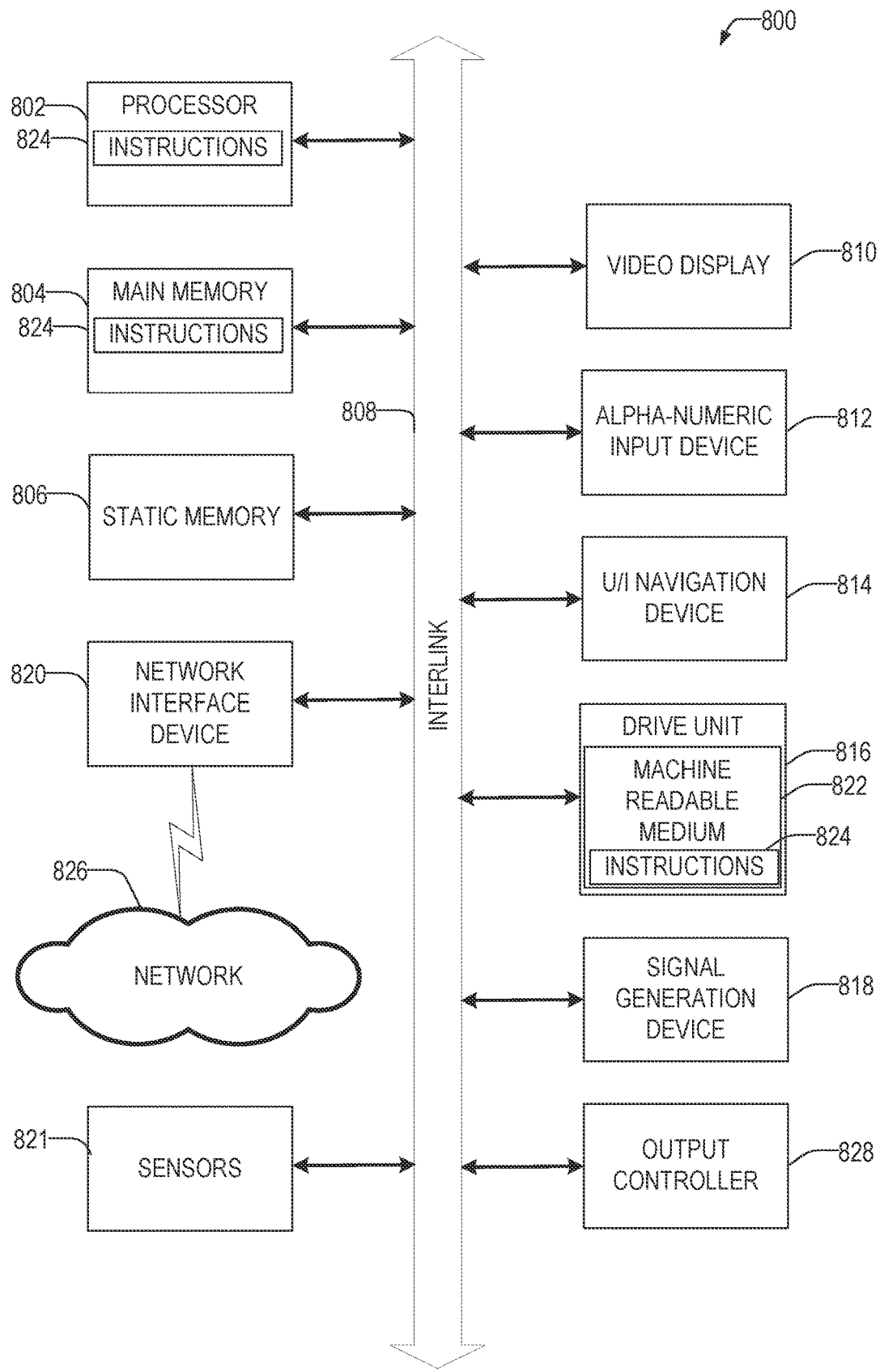
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may be performed. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be in the form of a memory device, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine may be configured to perform, or may be configured as any of the memory systems or components thereof, of FIGS. 1 and/or 2. In some examples, machine 800, or components thereof, may implement the method 700; train, execute, or implement a DNN or other neural network, and the like—such as shown in FIGS. 5 and 6.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 800 may include one or more hardware processors, such as processor 802. Processor 802 may be a central processing unit (CPU), a graphics processing unit (GPU), a hardware processor core, or any combination thereof. Machine 800 may include a main memory 804 and a static memory 806, some or all of which may communicate with each other via an interlink (e.g., bus) 808. Examples of main memory 804 may include Synchronous Dynamic Random-Access Memory (SDRAM), such as Double Data Rate memory, such as DDR4 or DDR5. Interlink 808 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 800 may further include a display unit 810, an alphanumeric input device (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 8'18 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared(IR), near field communication (NEC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 8'16 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The Machine 800 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi™, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

OTHER NOTES AND EXAMPLES

Example 1 is a method comprising obtaining previous memory access sequence data, the previous memory access sequence data identifying one or more memory addresses previously accessed by a processor; processing the memory access sequence data to obtain processed address sequence data; converting the processed address sequence data to a corresponding first set of delta values, the first set of delta values describing differences between addresses of the processed address sequence data; mapping, using a mapping table, each of the delta values of the first set of delta values to a corresponding class to produce a first set of class identifiers; inputting the class identifiers of the first set of class identifiers into a neural network, the neural network producing a predicted future class identifier sequence identifying a set of one or more class identifiers representing one or more predicted future class identifiers, the predicted future class identifiers representing addresses the neural network predicts will be accessed by the processor in the future; converting each of the predicted class identifiers in the predicted future class identifier sequence to produce a predicted delta value sequence comprising one or more delta values corresponding to the one or more class identifiers of the predicted future class identifier sequence; converting each of the predicted delta values in the predicted delta value sequence to produce a set of predicted addresses; and reading memory portions corresponding to selected ones of the addresses in the set of predicted addresses from a first memory system and into a second memory system.

In Example 2, the subject matter of Example includes, wherein the method further comprises: selecting ones of the addresses in the set of predicted addresses based upon a frequency with which each of the addresses appear in the set of predicted addresses.

In Example 3, the subject matter of Examples 1-2 includes, wherein producing a predicted future class identifier sequence identifying a set of one or more class identifiers comprises utilizing a first class identifier of the first set of class identifiers to predict a first one of the predicted future class identifier sequence and utilizing the first predicted class identifier to predict a second predicted class identifier in the predicted future class sequence.

In Example 4, the subject matter of Examples 1-3 includes, wherein the memory access sequence data is for a first and a second scheduling epoch, wherein converting the processed address sequence data to the corresponding first set of delta values comprises calculating a difference between an address from the first scheduling epoch and the second scheduling epoch, and wherein producing the predicted future class identifier sequence identifying the set of one or more class identifiers comprises utilizing a first class identifier of the first set of class identifiers to predict a first predicted class identifier in the predicted future class identifier sequence, the first class identifier corresponding to the first epoch and the first predicted future class identifier corresponding to the second epoch.

In Example 5, the subject matter of Examples 1-4 includes, wherein the first memory system is a non-volatile memory system and the second memory system is a volatile memory system.

In Example 6, the subject matter of Examples 1-5 includes, wherein processing the memory access sequence data to obtain processed address sequence data comprises obtaining one of: page addresses or memory addresses.

In Example 7, the subject matter of Examples 1-6 includes, wherein the neural network is a multilayer perceptron.

In Example 8, the subject matter of Examples 1-7 includes, wherein the neural network is a long short-term memory.

In Example 9, the subject matter of Examples 1-8 includes, wherein the memory portions comprise pages.

In Example 10, the subject matter of Examples 1-9 includes, wherein the method further comprises: creating a histogram from the addresses in the set of predicted addresses; identifying a cut-off threshold number of memory addresses; and wherein the selected ones of the addresses in the set of predicted addresses are the predicted addresses that are the cut-off threshold number of most frequent predicted addresses.

In Example 11, the subject matter of Examples 1-10 includes, executing a second predictor, and determining that a pace of prediction generation of the neural network is slower than a pace at which the processor is accessing memory, and in response, reading memory portions corresponding to a set of addresses predicted by the second predictor from the first memory system and into the second memory system.

In Example 12, the subject matter of Examples 1-41 includes, during a training phase, inserting random delays into a series of memory requests issued to a memory controller, the random delays causing a reordering of the series of memory requests; collecting memory access training sequence data based upon the training phase; and training a neural network based upon the memory access training sequence data.

Example 13 is a computing device comprising: a controller configured to perform operations comprising: obtaining previous memory access sequence data, the previous memory access sequence data identifying one or more memory addresses previously accessed by a processor; processing the memory access sequence data to obtain processed address sequence data; converting the processed address sequence data to a corresponding first set of delta values, the first set of delta values describing differences between addresses of the processed address sequence data; mapping, using a mapping table, each of the delta values of the first set of delta values to a corresponding class to produce a first set of class identifiers; inputting the class identifiers of the first set of class identifiers into a neural network, the neural network producing a predicted future class identifier sequence identifying a set of one or more class identifiers representing one or more predicted future class identifiers, the predicted future class identifiers representing addresses the neural network predicts will be accessed by the processor in the future; converting each of the predicted class identifiers in the predicted future class identifier sequence to produce a predicted delta value sequence comprising one or more delta values corresponding to the one or more class identifiers of the predicted future class identifier sequence; converting each of the predicted delta values in the predicted delta value sequence to produce a set of predicted addresses; and reading memory portions corresponding to selected ones of the addresses in the set of predicted addresses from a first memory system and into a second memory system.

In Example 14, the subject matter of Example 13 includes, wherein the operations further comprise: selecting ones of the addresses in the set of predicted addresses based upon a frequency with which each of the addresses appear in the set of predicted addresses.

In Example 15, the subject matter of Examples 13-14 includes, wherein the operations of producing a predicted future class identifier sequence identifying a set of one or more class identifiers comprises utilizing a first class identifier of the first set of class identifiers to predict a first one of the predicted future class identifier sequence and utilizing the first predicted class identifier to predict a second predicted class identifier in the predicted future class sequence.

In Example 16, the subject matter of Examples 13-15 includes, wherein the memory access sequence data is for a first and a second scheduling epoch, wherein the operations of converting the processed address sequence data to the corresponding first set of delta values comprises calculating a difference between an address from the first scheduling epoch and the second scheduling epoch, and wherein producing the predicted future class identifier sequence identifying the set of one or more class identifiers comprises utilizing a first class identifier of the first set of class identifiers to predict a first predicted class identifier in the predicted future class identifier sequence, the first class identifier corresponding to the first epoch and the first predicted future class identifier corresponding to the second epoch.

In Example 17, the subject matter of Examples 13-16 includes, wherein the first memory system is a non-volatile memory system and the second memory system is a volatile memory system.

In Example 18, the subject matter of Examples 13-17 includes, wherein the operations of processing the memory access sequence data to obtain processed address sequence data comprises obtaining one of: page addresses or memory addresses.

In Example 19, the subject matter of Examples 13-18 includes, wherein the neural network is a multilayer perceptron.

In Example 20, the subject matter of Examples 13-19 includes, wherein the neural network is a long short-term memory.

In Example 21, the subject matter of Examples 13-20 includes, wherein the memory portions comprise pages.

In Example 22, the subject matter of Examples 13-21 includes, wherein the operations further comprise: creating a histogram from the addresses in the set of predicted addresses; identifying a cut-off threshold number of memory addresses; and wherein the selected ones of the addresses in the set of predicted addresses are the predicted addresses that are the cut-off threshold number of most frequent predicted addresses.

In Example 23, the subject matter of Examples 13-22 includes, wherein the operations further comprise executing a second predictor, and determining that a pace of prediction generation of the neural network is slower than a pace at which the processor is accessing memory, and in response, reading memory portions corresponding to a set of addresses predicted by the second predictor from the first memory system and into the second memory system.

In Example 24, the subject matter of Examples 13-23 includes, wherein the operations further comprise: during a training phase, inserting random delays into a series of memory requests issued to a memory controller, the random delays causing a reordering of the series of memory requests; collecting memory access training sequence data based upon the training phase; and training a neural network based upon the memory access training sequence data.

Example 25 is a non-transitory machine-readable medium, storing instructions, which when executed by a machine, causes the machine to perform operations comprising: obtaining previous memory access sequence data, the previous memory access sequence data identifying one or more memory addresses previously accessed by a processor; processing the memory access sequence data to obtain processed address sequence data; converting the processed address sequence data to a corresponding first set of delta values, the first set of delta values describing differences between addresses of the processed address sequence data; mapping, using a mapping table, each of the delta values of the first set of delta values to a corresponding class to produce a first set of class identifiers; inputting the class identifiers of the first set of class identifiers into a neural network, the neural network producing a predicted future class identifier sequence identifying a set of one or more class identifiers representing one or more predicted future class identifiers, the predicted future class identifiers representing addresses the neural network predicts will be accessed by the processor in the future; converting each of the predicted class identifiers in the predicted future class identifier sequence to produce a predicted delta value sequence comprising one or more delta values corresponding to the one or more class identifiers of the predicted future class identifier sequence; converting each of the predicted delta values in the predicted delta value sequence to produce a set of predicted addresses; and reading memory portions corresponding to selected ones of the addresses in the set of predicted addresses from a first memory system and into a second memory system.

In Example 26, the subject matter of Example 25 includes, wherein the operations further comprise: selecting ones of the addresses in the set of predicted addresses based upon a frequency with which each of the addresses appear in the set of predicted addresses.

In Example 27, the subject matter of Examples 25-26 includes, wherein the operations of producing a predicted future class identifier sequence identifying a set of one or more class identifiers comprises utilizing a first class identifier of the first set of class identifiers to predict a first one of the predicted future class identifier sequence and utilizing the first predicted class identifier to predict a second predicted class identifier in the predicted future class sequence.

In Example 28, the subject matter of Examples 25-27 includes, wherein the memory access sequence data is for a first and a second scheduling epoch, wherein the operations of converting the processed address sequence data to the corresponding first set of delta values comprises calculating a difference between an address from the first scheduling epoch and the second scheduling epoch, and wherein producing the predicted future class identifier sequence identifying the set of one or more class identifiers comprises utilizing a first class identifier of the first set of class identifiers to predict a first predicted class identifier in the predicted future class identifier sequence, the first class identifier corresponding to the first epoch and the first predicted future class identifier corresponding to the second epoch.

In Example 29, the subject matter of Examples 25-28 includes, wherein the first memory system is a non-volatile memory system and the second memory system is a volatile memory system.

In Example 30, the subject matter of Examples 25-29 includes, wherein the operations of processing the memory access sequence data to obtain processed address sequence data comprises obtaining one of: page addresses or memory addresses.

In Example 31, the subject matter of Examples 25-30 includes, wherein the neural network is a multilayer perceptron.

In Example 32, the subject matter of Examples 25-31 includes, wherein the neural network is a long short-term memory.

In Example 33, the subject matter of Examples 25-32 includes, wherein the memory portions comprise pages.

In Example 34, the subject matter of Examples 25-33 includes, wherein the operations further comprise: creating a histogram from the addresses in the set of predicted addresses; identifying a cut-off threshold number of memory addresses; and wherein the selected ones of the addresses in the set of predicted addresses are the predicted addresses that are the cut-off threshold number of most frequent predicted addresses.

In Example 35, the subject matter of Examples 25-34 includes, wherein the operations further comprise executing a second predictor, and determining that a pace of prediction generation of the neural network is slower than a pace at which the processor is accessing memory, and in response, reading memory portions corresponding to a set of addresses predicted by the second predictor from the first memory system and into the second memory system.

In Example 36, the subject matter of Examples 25-35 includes, wherein the operations further comprise: during a training phase, inserting random delays into a series of memory requests issued to a memory controller, the random delays causing a reordering of the series of memory requests; collecting memory access training sequence data based upon the training phase; and training a neural network based upon the memory access training sequence data.

Example 37 is at least one machine-readable medium including instructions that, when executed by processing circuitry, cause the processing circuitry to perform operations to implement of any of Examples 1-36.

Example 38 is an apparatus comprising means to implement of any of Examples 1-36.

Example 39 is a system to implement of any of Examples 1-36.

Example 40 is a method to implement of any of Examples 1-36.

What is claimed is:

1. A method comprising:
   obtaining memory access sequence data, the memory access sequence data identifying one or more memory addresses previously accessed by a processor;
   processing the memory access sequence data to obtain processed address sequence data;
   converting the processed address sequence data to a corresponding first set of delta values, the first set of delta values describing differences between addresses of the processed address sequence data;
   mapping, using a mapping table, each of the delta values of the first set of delta values to a corresponding class to produce a first set of class identifiers, each delta value in the first set of delta values mapping to either a class specific to that delta value or a catch-all class depending on whether the delta value exceeded a threshold frequency in a training data set;
   inputting the class identifiers of the first set of class identifiers into a neural network, the neural network producing a predicted future class identifier sequence identifying a set of one or more class identifiers representing one or more predicted future class identifiers, the predicted future class identifiers representing addresses the neural network predicts will be accessed by the processor in the future, wherein producing the predicted future class identifier sequence identifying the set of one or more class identifiers comprises utilizing a first class identifier of the first set of class identifiers to predict a first predicted class identifier of the predicted future class identifier sequence and utilizing the first predicted class identifier to predict a second predicted class identifier in the predicted future class identifier sequence;
   converting each of the predicted class identifiers in the predicted future class identifier sequence to produce a predicted delta value sequence comprising one or more delta values corresponding to the one or more class identifiers of the predicted future class identifier sequence;
   converting each of the predicted delta values in the predicted delta value sequence to produce a set of predicted addresses; and
   reading memory portions corresponding to selected ones of the addresses in the set of predicted addresses from a first memory system and into a second memory system.

2. The method of claim 1, wherein the method further comprises:
   selecting ones of the addresses in the set of predicted addresses based upon a frequency with which each of the addresses appear in the set of predicted addresses.

3. The method of claim 1, wherein the memory access sequence data is for a first and a second scheduling epoch, wherein converting the processed address sequence data to the corresponding first set of delta values comprises calculating a difference between an address from the first scheduling epoch and the second scheduling epoch, and wherein the first class identifier corresponds to the first scheduling epoch and the first predicted future class identifier corresponds to the second scheduling epoch.

4. The method of claim 1, wherein the first memory system is a non-volatile memory system and the second memory system is a volatile memory system.

5. The method of claim 1, wherein processing the memory access sequence data to obtain processed address sequence data comprises obtaining one of:
   page addresses or memory addresses.

6. The method of claim 1, wherein the neural network is a multilayer perceptron.

7. The method of claim 1, wherein the neural network is a long short-term memory.

8. The method of claim 1, wherein the memory portions comprise pages.

9. The method of claim 1, wherein the method further comprises:
   creating a histogram from the addresses in the set of predicted addresses;
   identifying a cut-off threshold number of memory addresses;

and wherein the selected ones of the addresses in the set of predicted addresses are the predicted addresses that are the cut-off threshold number of most frequent predicted addresses.

10. The method of claim 1, further comprising executing a second predictor, and determining that a pace of prediction generation of the neural network is slower than a pace at which the processor is accessing memory, and in response, reading memory portions corresponding to a set of addresses predicted by the second predictor from the first memory system and into the second memory system.

11. The method of claim 1, further comprising:
during a training phase, inserting random delays into a series of memory requests issued to a memory controller, the random delays causing a reordering of the series of memory requests;
collecting memory access training sequence data based upon the training phase; and
training a neural network based upon the memory access training sequence data.

12. A computing device comprising:
a controller configured to perform operations comprising:
obtaining memory access sequence data, the memory access sequence data identifying one or more memory addresses previously accessed by a processor;
processing the memory access sequence data to obtain processed address sequence data;
converting the processed address sequence data to a corresponding first set of delta values, the first set of delta values describing differences between addresses of the processed address sequence data;
mapping, using a mapping table, each of the delta values of the first set of delta values to a corresponding class to produce a first set of class identifiers, each delta value in the first set of delta values mapping to either a class specific to that delta value or a catch-all class depending on whether the delta value exceeded a threshold frequency in a training data set;
inputting the class identifiers of the first set of class identifiers into a neural network, the neural network producing a predicted future class identifier sequence identifying a set of one or more class identifiers representing one or more predicted future class identifiers, the predicted future class identifiers representing addresses the neural network predicts will be accessed by the processor in the future, wherein producing the predicted future class identifier sequence identifying the set of one or more class identifiers comprises utilizing a first class identifier of the first set of class identifiers to predict a first predicted class identifier of the predicted future class identifier sequence and utilizing the first predicted class identifier to predict a second predicted class identifier in the predicted future class identifier sequence;
converting each of the predicted class identifiers in the predicted future class identifier sequence to produce a predicted delta value sequence comprising one or more delta values corresponding to the one or more class identifiers of the predicted future class identifier sequence;
converting each of the predicted delta values in the predicted delta value sequence to produce a set of predicted addresses; and
reading memory portions corresponding to selected ones of the addresses in the set of predicted addresses from a first memory system and into a second memory system.

13. The computing device of claim 12, wherein the operations further comprise:
selecting ones of the addresses in the set of predicted addresses based upon a frequency with which each of the addresses appear in the set of predicted addresses.

14. The computing device of claim 12, wherein the memory access sequence data is for a first and a second scheduling epoch, wherein the operations of converting the processed address sequence data to the corresponding first set of delta values comprises calculating a difference between an address from the first scheduling epoch and the second scheduling epoch, and wherein the first class identifier corresponds to the first scheduling epoch and the first predicted future class identifier corresponds to the second scheduling epoch.

15. The computing device of claim 12, wherein the first memory system is a non-volatile memory system and the second memory system is a volatile memory system.

16. The computing device of claim 12, wherein the operations of processing the memory access sequence data to obtain processed address sequence data comprises obtaining one of:
page addresses or memory addresses.

17. A non-transitory machine-readable medium, storing instructions, which when executed by a machine, causes the machine to perform operations comprising:
obtaining memory access sequence data, the memory access sequence data identifying one or more memory addresses previously accessed by a processor;
processing the memory access sequence data to obtain processed address sequence data;
converting the processed address sequence data to a corresponding first set of delta values, the first set of delta values describing differences between addresses of the processed address sequence data;
mapping, using a mapping table, each of the delta values of the first set of delta values to a corresponding class to produce a first set of class identifiers, each delta value in the first set of delta values mapping to either a class specific to that delta value or a catch-all class depending on whether the delta value exceeded a threshold frequency in a training data set;
inputting the class identifiers of the first set of class identifiers into a neural network, the neural network producing a predicted future class identifier sequence identifying a set of one or more class identifiers representing one or more predicted future class identifiers, the predicted future class identifiers representing addresses the neural network predicts will be accessed by the processor in the future, wherein producing the predicted future class identifier sequence identifying the set of one or more class identifiers comprises utilizing a first class identifier of the first set of class identifiers to predict a first predicted class identifier of the predicted future class identifier sequence and utilizing the first predicted class identifier to predict a second predicted class identifier in the predicted future class identifier sequence;
converting each of the predicted class identifiers in the predicted future class identifier sequence to produce a predicted delta value sequence comprising one or more delta values corresponding to the one or more class identifiers of the predicted future class identifier sequence;
converting each of the predicted delta values in the predicted delta value sequence to produce a set of predicted addresses; and reading memory portions corresponding to selected ones of the addresses in the set of predicted addresses from a first memory system and into a second memory system.

18. The non-transitory machine-readable medium of claim 17, wherein the operations further comprise:
selecting ones of the addresses in the set of predicted addresses based upon a frequency with which each of the addresses appear in the set of predicted addresses.

* * * * *